R. B. DISBROW.
COMBINED CHURN AND BUTTER WORKER.
APPLICATION FILED OCT. 7, 1909.

961,940.

Patented June 21, 1910.

Witnesses.
A. H. Opsahl
H. D. Kilgore

Inventor
R. B. Disbrow
By his Attorneys
Williamson Merchant

UNITED STATES PATENT OFFICE.

REUBEN B. DISBROW, OF OWATONNA, MINNESOTA.

COMBINED CHURN AND BUTTER-WORKER.

961,940.  Specification of Letters Patent.  Patented June 21, 1910.

Application filed October 7, 1909. Serial No. 521,564.

*To all whom it may concern:*

Be it known that I, REUBEN B. DISBROW, a citizen of the United States, residing at Owatonna, in the county of Steele and State of Minnesota, have invented certain new and useful Improvements in Combined Churns and Butter-Workers; and I do hereby declare the following to be a full, clear, and exact description of the invention, such as will enable others skilled in the art to which it appertains to make and use the same.

My invention has for its object to provide a combined churn and butter worker of simple construction and highly efficient action, and to this end, it consists of the novel devices and combinations of devices hereinafter described and defined in the claims.

In the accompanying drawings, which illustrate the invention, like characters indicate like parts throughout the several views.

Figure 2:
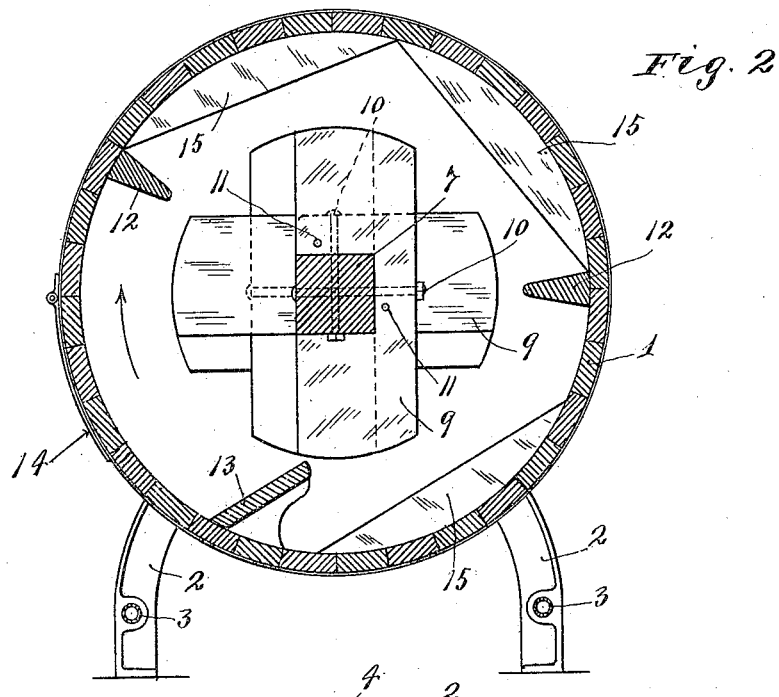
Figure 1:
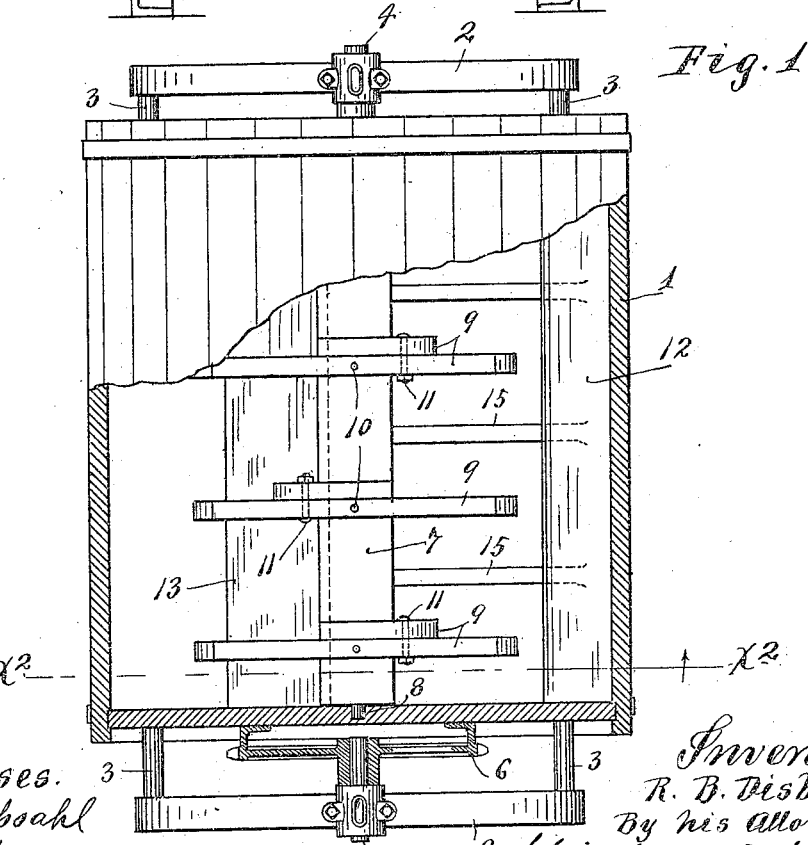

Referring to the drawings, Figure 1 is a view partly in plan and partly in horizontal section, showing the improved machine; and Fig. 2 is a transverse vertical section taken on the line $x^2$ $x^2$ of Fig. 1.

A horizontal rotary drum 1 is mounted to rotate on end brackets 2, which, at their lower portions, are rigidly tied together by tie rods or bars 3. As shown, the said drum is journaled to the said end brackets by a heavy trunnion 4 on one of the drum heads and by another trunnion 5 which is rigidly secured to the hub of a sprocket wheel 6 which, in turn, is bolted or otherwise rigidly secured to the adjacent drum head.

Extended longitudinally within the drum from head to head thereof, with its axis coincident with the axis of said drum, is a single working roller 7 provided at its ends with trunnions 8 journaled in the drum heads. This working roller is provided with laterally separated working blades 9 spaced longitudinally of said roller. Preferably, the said roller 7 is square in cross section and the working blades 9 are notched to fit the same and are directly secured to said roller by diametrically extended nutted bolts 10. Furthermore, said blades are arranged in pairs extended at right angles to each other, with the adjacent members connected to each other by short nutted bolts 11. This arrangement gives very strong and, at the same time, cheap construction. All of the said working blades lie in planes at right angles to the axis of the said roller and they extend approximately radially therefrom.

In the preferred arrangement shown in the drawings, the drum is provided with three lifting flights that extend from head to head thereof and inward from the peripheral shell of said drum. Two of these lifting flights are shown as alike and extend radially inward from the cylindrical shell of the drum and are indicated by the numeral 12. The third flight 13 extends inward and backward in respect to the rotation of the drum, which direction of rotation is indicated by the arrow marked on the drum in Fig. 2. The door 14 is located between the lifting flight 13 and one of the flights 12 and the drum between the two lifting flights 12, and between the other lifting flight and said flight 13 are dividing webs or ribs 15 that extend circumferentially of the drum.

The working roller is an idle roller, that is, is perfectly free for rotation under the weight of the butter acting on the working blades 9 thereof, but no means is provided for positively driving said roller. The drum is adapted to be rotated by a power-driven sprocket chain, not shown, which will run over the sprocket wheel 6.

The action of the improved machine is substantially as follows: In the churning action, the cream will be raised and dashed about within the rotating drum by the flights 12 and 13 and will be further agitated by the blades of the working roller.

In the butter working action, the butter will be continuously raised on the rising side of the drum and will continually roll backward and, hence, in continuous engagement with the blades 9 of the working roller. These working blades will cut the butter and the ends of said blades will continuously push their way into the body of the butter, so that salt will be very thoroughly worked into the butter. The butter, as it rolls backward under the action of gravity on the rising side of the drum and into engagement with the blades of the working roller, will cause the said working roller to be rotated in a direction reverse to the direction of the rotation of the drum and the said blades will, therefore, continuously press and work the butter as it rolls backward and downward. This rolling action brings all particles of the butter into engagement with the working blades and keeps up a continuous working of the butter, thus rendering the machine highly efficient as a butter worker.

The backwardly extended lifting flight 13, it will be noted, is located in the vicinity of the door 14 but some little distance below the door opening, on the rising side of the drum, and, hence, affords a suitable shelf for supporting the butter when the drum is standing still and the door is open.

The machine may be constructed at comparatively small cost, is highly efficient for the purposes had in view and the absence of gears, for driving the same, renders the same practically noiseless.

What I claim is:

1. In a butter worker, the combination with an approximately horizontal rotary drum, of a working roller loosely journaled therein and provided with laterally separated working blades spaced longitudinally of said roller, and which roller is adapted to be rotated by the weight of the butter engaged with the blades thereof on the rising side of the drum.

2. In a butter worker, the combination with a horizontally disposed rotary drum, provided with one or more lifting flights, of a working roller loosely journaled in said drum at the axis thereof and provided with laterally separated working blades spaced longitudinally on said roller, and which roller is adapted to be rotated by the weight of the butter engaged with the blades thereof on the rising side of the drum, substantially as described.

3. In a butter worker, the combination with a horizontally disposed rotary drum provided with one or more lifting flights, of a working roller loosely journaled in said drum, working blades having notches embracing said working roller and arranged in transverse intersecting pairs rigidly secured to said roller and to each other, substantially as described.

4. In a butter worker, the combination with a horizontally disposed rotary drum, of a working roller having a square cross section journaled in said drum, working blades having notches fitting the said rollers, bolts passing diametrically through said roller and through said blades, and bolts connecting said blades in transverse intersecting pairs, substantially as described.

5. In a butter worker, the combination with a horizontally disposed drum provided with a multiplicity of lifting flights, of a working roller loosely journaled in said drum at the axis thereof, working blades secured to and longitudinally spaced on said working roller, and circumferentially extended segmental dividing webs secured to the interior of the cylindrical shell of said drum between said lifting flights, substantially as described.

6. In a butter worker, the combination with a horizontally disposed rotary drum provided with a multiplicity of lifting flights, one of which is extended inward and backward in respect to the rotation of the drum, said drum having a door in the vicinity of said latter noted flight, and a working roller loosely journaled in the said drum at the axis thereof and provided with laterally separated working blades rigidly secured to said roller and spaced longitudinally thereof, substantially as described.

7. In a butter worker, the combination with an approximately horizontal rotary drum, of a working roller loosely journaled therein and provided with laterally separated working blades spaced longitudinally of said roller.

In testimony whereof I affix my signature in presence of two witnesses.

REUBEN B. DISBROW.

Witnesses:
H. D. KILGORE,
ALICE V. SWANSON.